US012488455B2

(12) United States Patent
Wittreich et al.

(10) Patent No.: US 12,488,455 B2
(45) Date of Patent: Dec. 2, 2025

(54) MONITORING A FLUX APPLICATION

(71) Applicant: Siemens Aktiengesellschaft, Munich (DE)

(72) Inventors: Ulrich Wittreich, Velten (DE); Rene Blank, Berlin (DE); Michael Hanisch, Hohen Neuendorf (DE); Marco Matiwe, Berlin (DE); Dennis Sommerfeld, Berlin (DE); Kay Jarchoff, Schönfließ (DE); Bernd Müller, Falkenberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 18/807,656

(22) Filed: Aug. 16, 2024

(65) Prior Publication Data
US 2025/0061564 A1 Feb. 20, 2025

(30) Foreign Application Priority Data
Aug. 18, 2023 (EP) .................................. 23192185

(51) Int. Cl.
*B23K 1/00* (2006.01)
*B23K 1/20* (2006.01)
(Continued)

(52) U.S. Cl.
CPC .............. *G06T 7/001* (2013.01); *B23K 1/203* (2013.01); *G01J 5/485* (2022.01); *G06T 2207/30141* (2013.01); *G06T 2207/30152* (2013.01)

(58) Field of Classification Search
CPC .......... B23K 1/203; B23K 3/08; B23K 3/082; G06T 2207/30152; H05K 13/0817; H05K 2203/163; H05K 3/3489
See application file for complete search history.

(56) References Cited

U.S. PATENT DOCUMENTS

| 6,597,444 B1* | 7/2003 | Halderman | ........ G01N 21/8422 356/237.1 |
| 9,198,300 B2* | 11/2015 | Dautenhahn | ........... B23K 1/008 |

(Continued)

FOREIGN PATENT DOCUMENTS

| CN | 111774688 B | 10/2020 |
| CN | 114660126 A | 6/2022 |

(Continued)

OTHER PUBLICATIONS

Taiwan Office Action, Application No. 113130909, 9 pages.
(Continued)

*Primary Examiner* — Erin B Saad
(74) *Attorney, Agent, or Firm* — Slayden Grubert Beard PLLC

(57) ABSTRACT

Various embodiments of the teachings herein include a method for monitoring a flux application in a soldering process. An example includes: defining flux wetting surfaces in relation to an image of an application surface; generating a thermographic recording of the application surface selectively provided with liquid flux; defining adjustment points on the application surface which can be identified on the image and on the thermographic recording; superimposing the image and the thermographic recording on the basis of the adjustment points; and comparing the position of temperature anomalies on the application surface identified by the thermographic recording with the position of the flux wetting surfaces on the image.

9 Claims, 3 Drawing Sheets

(51) Int. Cl.
　　　*G01J 5/48*　　　(2022.01)
　　　*G06T 7/00*　　　(2017.01)

(56) References Cited

U.S. PATENT DOCUMENTS

| | | | | |
|---|---|---|---|---|
| 2002/0179834 A1* | 12/2002 | Feygin | .................. | G01N 21/35 |
| | | | | 422/50 |
| 2007/0241165 A1* | 10/2007 | Deram | .................. | B23K 1/203 |
| | | | | 228/101 |
| 2020/0170155 A1* | 5/2020 | Zheng | .................. | B23K 3/082 |
| 2021/0302374 A1* | 9/2021 | Jack | .................. | G01N 29/0645 |
| 2021/0310994 A1* | 10/2021 | Jack | .................. | G01N 29/0645 |
| 2021/0364472 A1* | 11/2021 | Jack | .................. | G01N 29/2456 |
| 2023/0236153 A1* | 7/2023 | Jack | ....................... | G01N 29/46 |
| | | | | 73/625 |

FOREIGN PATENT DOCUMENTS

| | | |
|---|---|---|
| CN | 115996809 A | 4/2023 |
| TW | I392423 B | 4/2013 |
| TW | 202326123 A | 7/2023 |

OTHER PUBLICATIONS

Korean Office Action, Application No. 2025-045528883, 7 pages.
Search Report for EP Application No. 23192185.9, 6 pages, Jan. 31, 2024.

\* cited by examiner

MONITORING A FLUX APPLICATION

CROSS-REFERENCE TO RELATED APPLICATIONS

This application claims priority to EP Application Serial No. 23192185.9 filed Aug. 18, 2023, the contents of which are hereby incorporated by reference in their entirety.

TECHNICAL FIELD

The present disclosure relates to flux applications. Various embodiments of the teachings herein include methods and/or systems for monitoring a flux application.

BACKGROUND

In soldering processes, for example, in wave soldering systems or selective soldering systems, the soldering point is selectively provided with a flux before the soldering process. This process is highly automated, the individual surfaces to be wetted of a printed circuit board being sprayed with a flux jet for a short period of time so that the appropriate amount of flux is present at the required solder points. For the quality of the soldering process, however, it is important that the amount of flux present is precisely dosed at the right place. This applies to both the position of the flux application and the amount of flux which is applied to the printed circuit board at the corresponding is not position. Currently, it satisfactorily possible to check the flux application on the product during the process, so that fluctuations in the application of flux may lead to soldering problems and reductions in quality.

Current checking options for flux application are either random checks with special product dummies, which are carrier plates with holes on the top and an indicator paper applied there, or alternatively, detectors of an interruption of a light beam can also check the flux application jet by means of laser light barriers, for example. Detection of the flux on the products to be manufactured, i.e. on a printed circuit board surface, is only possible with difficulty using visual methods due to the transparent appearance of the flux. Continuous automated checking of the transfer quality at product level during manufacture can therefore only be guaranteed to an unsatisfactory extent at present.

SUMMARY

The teachings of the present disclosure provide systems and/or methods for monitoring a flux application in a soldering process, by means of which the defects in the flux application occurring before the actual soldering process can be detected. Various embodiments of the teachings herein include a method for monitoring a flux application 2 in a soldering process 4 comprising: defining flux wetting surfaces 6 in relation to an image 8 of an application surface 10; generating a thermographic recording 12 of the application surface 10 selectively provided with liquid flux 14, defining adjustment points 16 on the application surface 10 which can be identified on the image 8 and on the thermographic recording 12, superimposing the image 8 and the thermographic recording 12 on the basis of the adjustment points 16, and comparing the position of temperature anomalies 18 on the application surface 10, which are identified by means of the thermographic recording 12, with the position of the flux wetting surfaces 6 on the image 8.

In some embodiments, a temperature threshold value 20 is set for the temperature anomalies 18.

In some embodiments, a measure 22 for influencing the soldering process 4 is initiated if, within a time interval 23 after application of the flux 14, a temperature T determined by means of the thermographic recording 12 is on a flux wetting surface 6 beyond the temperature threshold value 20.

In some embodiments, the temperature T is considered as a function of time t.

In some embodiments, a reference profile 24 of a temperature-time curve is recorded on a defined flux wetting surface Z and is compared with the temperature-time profile 26.

In some embodiments, a tolerance range 28 of the reference profile 24 is defined, and the measure 22 is initiated when the considered temperature-time profile 26' is outside the tolerance range 28.

In some embodiments, the measure is taken when the temperature T on the flux wetting surfaces 6 is above the temperature threshold value 20.

In some embodiments, the thermographic recording 12 comprises a plurality of such recordings within a period of time.

In some embodiments, a renewed application of the flux to the detected flux wetting surfaces is initiated as a measure 22.

In some embodiments, a cleaning of flux application nozzles is initiated as a measure 22.

In some embodiments, the image is a photographic recording of the application surface to be observed.

As another example, some embodiments include a computer program comprising a digital twin for controlling a method for monitoring a flux application in a soldering process as described herein, in which the image 8 is present as a digital image 8 and the flux wetting surfaces 6 and the adjustment points 16 are stored as part of the digital image 8.

As another example, some embodiments include a computer system with a computer program as described herein.

BRIEF DESCRIPTION OF THE DRAWINGS

Further examples and further features of the teachings herein are explained in more detail with reference to the following figures. These are purely exemplary embodiments which do not constitute a limitation of the scope of the disclosure. In the drawings.

DETAILED DESCRIPTION

Figure 1:
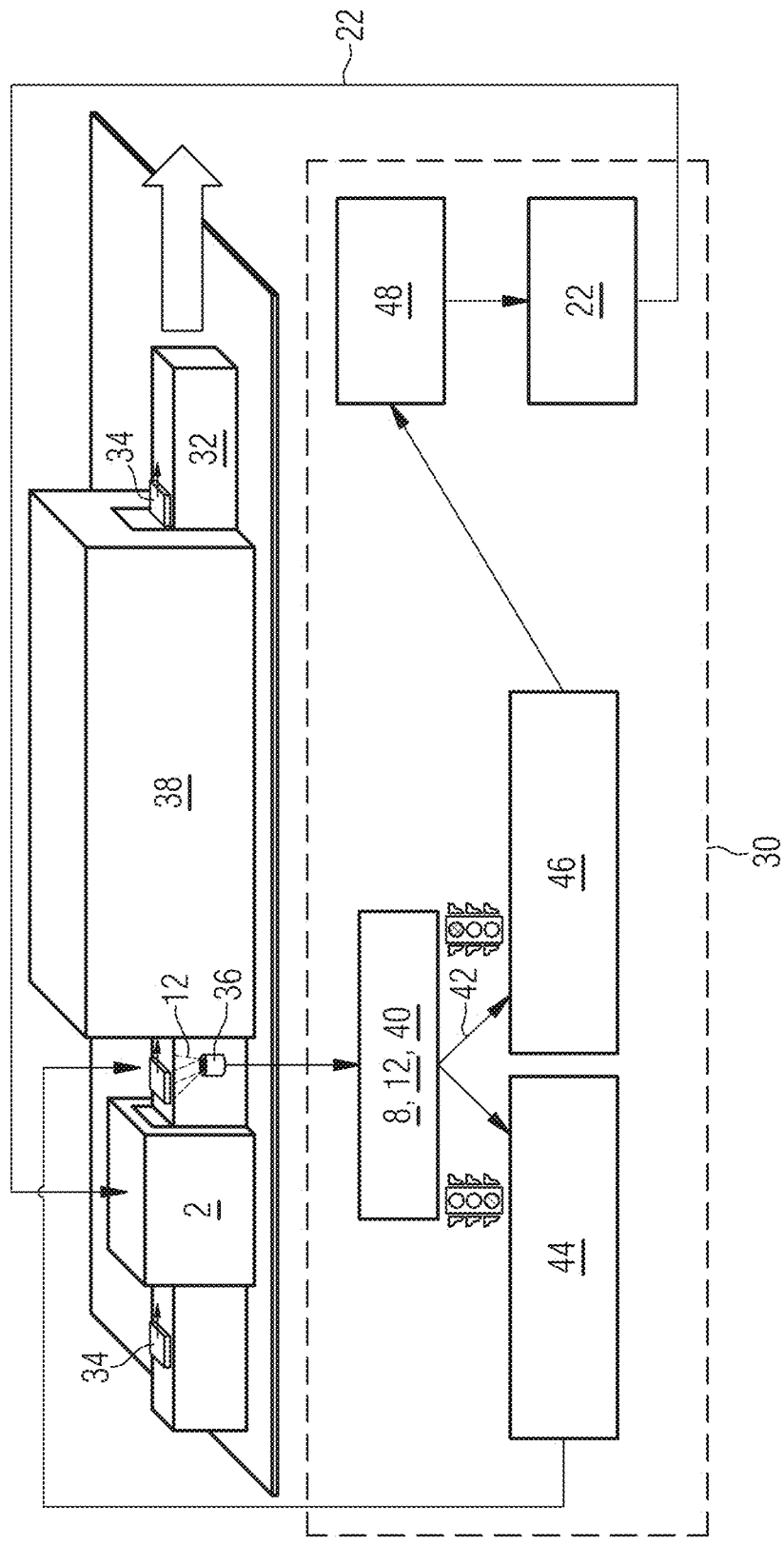
FIG. 1 shows a schematic flow chart of an example method incorporating teachings of the present disclosure.

The teachings of the present disclosure include methods for monitoring a flux application in a soldering process. An example comprises: defining flux wetting surfaces in relation to an image of an application surface, generating a thermographic recording of the application surface selectively provided with liquid flux, defining adjustment points on the application surface which can be identified on the image and on the thermographic recording, superimposing the image and the thermographic recording on the basis of the adjustment points, and comparing the position of temperature anomalies on the application surface, which are identified by means of the thermographic recording, with the position of the flux wetting surfaces on the image.

The application surface, usually the surface of a printed circuit board to be provided with solder points, is thermographically examined after the flux has been applied. After a certain time following application, temperature anomalies occur on the flux wetting surfaces compared to the surrounding surface. These temperature anomalies, which will be described in more detail below, result from the enthalpy which occurs during the partial evaporation of flux components, in particular solvents of the flux, and extract heat from the wetted surface. For this reason, the wetted surfaces of the application surfaces are cooler than the non-wetted surfaces. If the thermographic recording is compared with an image made before wetting (a photographic image or also a digital twin of the image from a CAD system), fixed points, which are referred to here as adjustment points, can be used to determine whether the specific, defined flux wetting surfaces are actually provided with flux and are also sufficiently provided if the temperatures there are lower than on the other areas of the application surface. In this way, the soldering process can be specifically influenced and the quality assurance of the soldering process thus may be improved compared to the prior art.

Definitions

Soldering process: A soldering process means any joining methods in which a connection is produced between two metallic components by means of an additive (solder) through heat treatment. Typically, the metallic components do not melt in depth, but alloying processes take place in their surface areas, resulting in a material connection. For this purpose, flux is used in a supportive manner, which in particular has a reducing effect on the surfaces of the metallic components to be soldered and thus frees these surfaces of oxide layers. In addition, fluxes can also support the described alloying process as activators. Therefore, fluxes can also include several chemical components such as acids and chlorides. This definition can also include certain welding processes, which is the case when a flux is also used in addition to an additive (solder).

The image of the application surface, which is typically a printed circuit board surface, can be a design representation, for example, from a CAD program, but it can also be a photographic image of the real existing printed circuit board or its surface. The image is stored in a computer system, for example, in a system controller such as, for example, a Siemens S7 1500 and/or its peripheral devices, or it is stored there directly after the recording is made. As a rule, the image is transferred to the computer system or the system controller in the form of pixels. The same also applies to thermographic recording, which may be carried out in the form of an infrared recording. Individual point temperature measurements, for example with a thermocouple, are also thermographic recordings if the point under consideration can be located with respect to the image.

Adjustment points are geometric shapes (not just points in the mathematical sense) on the application surface which are sufficiently characteristic to ensure an unambiguous assignment of the representation of the image and the thermographic recording. At least two adjustment points are preferably provided for unambiguous adjustment. For example, the flux wetting surfaces can already serve as adjustment points. Based on the defined adjustment points, the image of the printed circuit board surface and the thermographic recording can be superimposed or overlaid. The term overlay is used in a figurative sense, analogous to an image and a transparent film. In the case of purely digital images, overlaying consists of an electronic comparison, for example by an image analysis program, the recording and the image being evaluated on the basis of the defined adjustment points by means of individual pixels or pixel clusters.

Temperature anomalies are visible points or areas on the thermographic recording which exhibit a temperature difference compared to the surrounding area. As a rule, a constant temperature does not necessarily occur within a temperature anomaly, but rather there is a temperature interval which does not intersect with a temperature interval exhibited by the surrounding surfaces. Therefore, to determine a limit between the temperature anomaly and the surrounding area, it is useful to define a threshold temperature, i.e. a temperature threshold value.

The term time interval refers to the period of time from the application of the flux to the flux wetting surface to a defined point in time of a final thermographic recording. However, as several thermographic recordings can be made in this time interval (for example, by an infrared video recording), it may also be useful to consider the temperature as a function of time and to compare it with an empirically determined temperature-time profile (reference profile). In this case, the term temperature refers to a point on the temperature-time curve, for example, also the end point of the curve. For this purpose, it may be advantageous to define a tolerance range of the reference profile. This can be, for example, one or two curves running parallel to the reference profile, in the range of which the considered temperature-time profile should lie. The considered time profile of the temperature-time observation corresponds to the time interval. It is not absolutely necessary that several thermographic recordings are evaluated within the time interval.

A digital twin is a digital representation of a tangible or intangible object or process from the real world in the digital world. Digital twins enable a comprehensive exchange of data. They are more than just data and consist of models of the represented object or process and can also contain simulations, algorithms and services which describe or influence properties or behavior of the represented object or process, or enable services via them.

In some embodiments, a temperature threshold value is defined for the temperature anomalies. This may make it easier, for the evaluation of the temperature anomalies, to distinguish them from the surrounding areas of the application surface.

In some embodiments, a measure for influencing the soldering process is taken if, within a time interval after application of the flux, a temperature on a flux wetting surface determined by means of the thermographic recording is above the temperature threshold value. In this way, the quality of the finished solder points can be improved by direct intervention in the soldering process and the upstream flux application process.

A measure can be to initiate a renewed application of the flux to the detected flux wetting surface. Another advantageous measure can be to perform a cleaning process of flux application nozzles.

The temperature within the temperature anomaly can be measured at a fixed time after spraying on the flux. However, it is also expedient to consider the temperature as a function of time. In this way, the evaporation behavior of the applied flux or components of the flux can be observed more closely and thus more stable information about the amount of flux actually applied to the specific location can be determined. In this way, even better quality assurance can be achieved.

For this purpose, it is in turn expedient that a reference profile of a temperature-time curve on a defined flux wetting surface Z is recorded and compared with the temperature-time profile under consideration. An empirically determined reference profile of the temperature development over time, where the amount of flux applied is precisely known, can be used to relate the currently measured temperature-time profile to a specific amount of flux. For this purpose, it is again useful if a tolerance range of the reference profile is defined. The measure for influencing the soldering process is only initiated when the temperature-time profile under consideration lies outside this tolerance range.

In particular, the measure is only taken when the temperature on the flux wetting surface is above the temperature threshold value. If this is the case, insufficient flux has been applied because, as already mentioned, the evaporation enthalpy of flux components leads to a cooling of the application surface. If this cooling has not taken place due to insufficient application of flux, the temperature remains higher than, for example, the temperature threshold value.

In some embodiments, the thermographic recording is designed in such a way that a plurality of such recordings are captured within a period of time. This means that, as a rule, a video recording is made. In particular, this can take place using an infrared video camera. In turn, the image can be a photographic recording of the application surface to be observed. This photographic recording can be made on the current application surface after the application of flux and then entered into a computer program or a computer system in digital form.

Some embodiments include a computer program comprising a digital twin which is used to control a method for monitoring a flux application in a soldering process as described herein. In this computer program, the image is available as a digital image and the flux wetting surfaces and the adjustment points are stored as components of the digital image. This computer program is preferably used to compare the image with the corresponding points marked on it with the thermographic recordings and to automatically generate an error message if, according to the aforementioned method claims, the application of flux does not correspond to the specified measures.

Some embodiments include a computer system with a computer program as described herein. The computer system can, for example, be a process controller. However, a cloud-based control solution can also be used.

FIG. 1 shows a schematic view of a soldering method and an example method for monitoring a flux application in a soldering process incorporating teachings of the present disclosure. Both methods interact so that the quality assurance of the soldering method is influenced by the monitoring method. First, a conveyor belt 32 is provided on which a printed circuit board 34 with an application surface 10 is transported, the application surface 10 in this case being a printed circuit board surface 10. First, a flux application 2 is carried out in a so-called flux module, where a flux 14 is sprayed onto flux wetting surfaces 6 (not visible in FIG. 1, see FIG. 2) using a directed jet which is interrupted in very short cycles. A flux nozzle, not shown here, is provided through which the flux 14 emerges. The flux nozzle, which is not shown, can be moved at an angle to the printed circuit board surface 10 by means of a control system, which, for example, can be an integral part of a computer system 30. Likewise, the flux jet can be specifically interrupted by this described control system so that the flux 14 hits the intended place on the printed circuit board surface 10, i.e. the flux wetting surfaces, at the intended point in time.

The method for monitoring the flux application 2 is then carried out. For this purpose, a thermographic recording 12 is recorded by means of an infrared camera 36, the thermographic recording 12 being integrated into a computer system 30. An image 8 of the printed circuit board surface 10 is also stored in the computer system 30. This image 8 may, for example, be an extract from a CAD system of the printed circuit board 34, but it may also be expedient to make a photographic recording of the printed circuit board surface 10 at the same time as the thermographic recording 12. In this case, both the photographic recording of the image 8 and the thermographic recording 12 are entered into the computer system 30 during the process and compared digitally.

In this digital comparison, which is also referred to as superimposition of the image 8 and the recording 12, both the image 8 and the thermographic recording 12 are broken down into individual pixels and compared with regard to predetermined adjustment points 16. The adjustment points 16 are characteristic points which are electronically identifiable on both the image 8 and the thermographic recording 12. The flux wetting surfaces 6 can be useful adjustment points 16. The flux wetting surfaces 6 are defined by the fact that solder points are located there, which are provided with a soldering agent in the further course of the soldering process. The flux is used to chemically reduce these areas before soldering so that there are no oxidation layers on the surface at this point which could impair the solder connection.

The application of the flux 14 results in an evaporation process of the highly volatile substances of the flux 14 and local cooling of the printed circuit board surface 10. This local cooling is due to evaporation enthalpy, which extracts heat locally from the printed circuit board surface 10 at precisely the location of the flux wetting surface 6. The thermographic recording 12, which is in the form of an infrared recording as a rule, can be used to observe this local cooling on the printed circuit board surface 10 in the form of temperature anomalies. The definition and the evaluation of these temperature anomalies 18 will be discussed below.

This superimposition of the recording 12 and the image 8 described takes place in the aforementioned computer system 30. This computer system 30 may include a computer and a database. Furthermore, the computer system 30 may include a process control unit such as, for example, a Siemens Simatic S 7 1500. This control facility, which is not explicitly shown here, controls the process and receives information for control from other components of the computer system 30. It is also possible to perform the superimposition 40 directly in the controller. Furthermore, it may also be expedient to use a cloud-based controller for the soldering process 4 and for the monitoring method described. In this case, the computer system 30 would not be located, or would only partially be located, in close proximity to the soldering process 4.

By means of the superimposition 40, it is calculated in the computer system 30 on the basis of determined reference data, which will also be discussed in more detail, whether the temperature anomalies 18 correspond to a satisfactory application of flux 14 (temperature evaluation 42). If there is a positive temperature evaluation 44, the soldering process 4 is continued. In this case, the printed circuit board 34 is introduced into the soldering unit 38 via the conveyor belt 32. This can be a wave soldering unit or a selective soldering unit. The soldering process is carried out as planned and the printed circuit board 34 is then supplied for further use. However, if the situation arises during superimposition 40 that the determined temperature anomalies 18 do not correspond to the specifications (negative temperature evaluation 46), this may indicate a quality defect when applying the flux 14 to the defined flux wetting surfaces 6.

In this case, data analysis 48 is carried out using the computer system 30. Here, the available information from the thermographic recording 12, the image 8, but also other process parameters not previously mentioned, such as, for example, the functioning of the flux nozzle (not shown), are evaluated. For example, the result can be that the flux nozzle is clogged or the pressure of the flux jet is too low. The motion control of the flux nozzle may also be faulty. Based on this information, a measure 22 is determined by means of the data analysis 48, which counteracts possible quality defects in the flux application. This measure 22 can be, for example, a cleaning of the flux nozzle or an adaptation of the control of the flux nozzle. Furthermore, the measure can also consist of phasing out the considered printed circuit board from the process and reapplying flux 14 in the flux application process 2.

Figure 2:
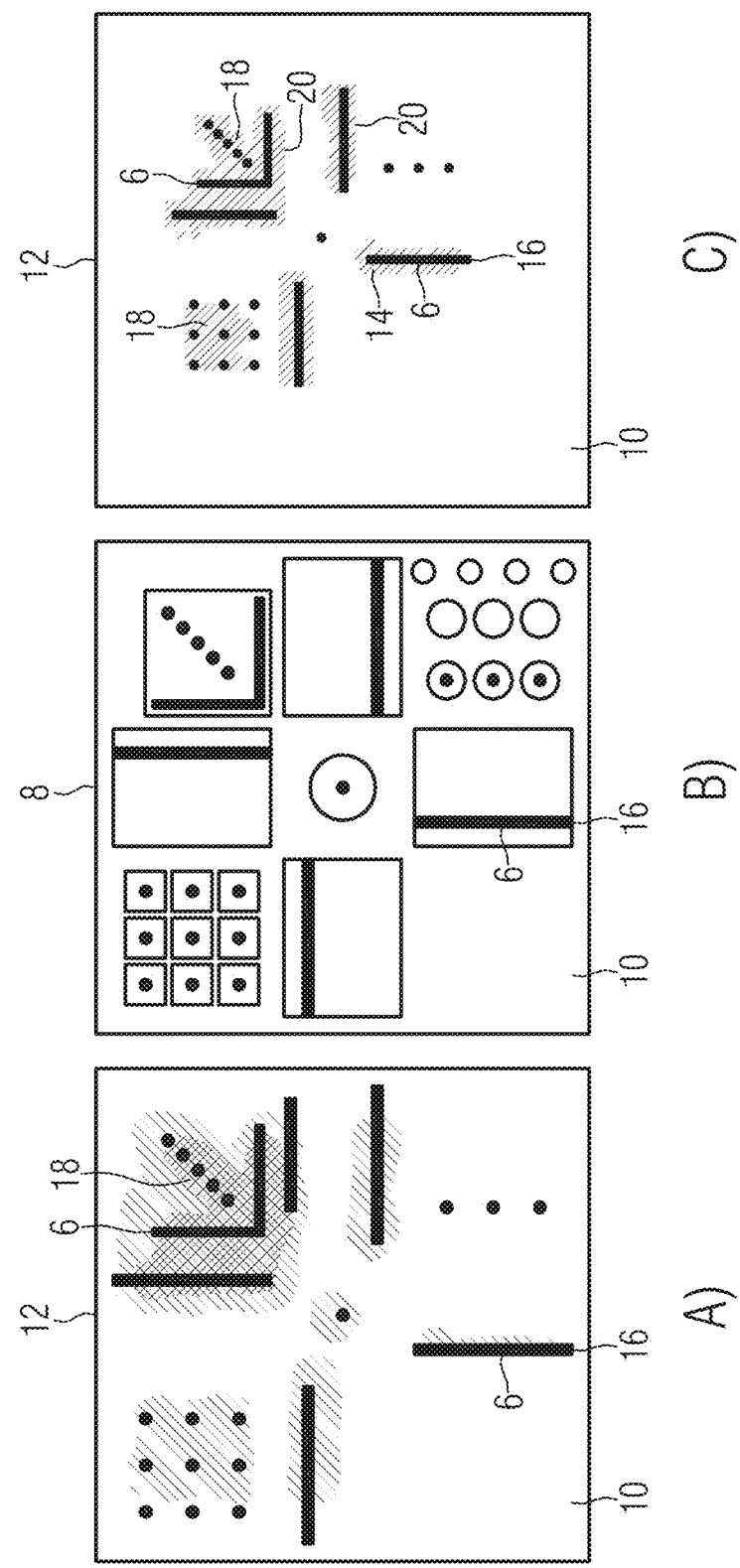
FIGS. 2a and c show thermographic recordings of an application surface in an application of the methods described herein.
FIG. 2b shows an image of the application surface in an application of the methods described herein.

FIG. 2 shows an example of a printed circuit board surface 10 created using various recordings. FIGS. 2a, 2b and 2c each show the same section of the printed circuit board surface 10, an infrared camera being used in FIG. 2a. This is therefore a thermographic recording 12, which is, however, very rich in contrast. Temperature anomalies 18 occur here, but these have a certain smooth transition to their surroundings. On the defined flux wetting surfaces 6, which also serve as adjustment points 16, it is noticeable that the temperature is measurably lower than on the surrounding surfaces. FIG. 2b shows the image 8 of the same printed circuit board surface, which is an extract from the CAD model which was created for the construction of the printed circuit board 34. In principle, a photographic recording determined during the process would also be useful for this purpose. This would be particularly useful if further changes were to be expected as a result of the process, which could not be detected using the purely calculated CAD image 8. The image 8 also contains the described flux wetting surfaces 6, which in turn represent the adjustment points 16. Since, as shown in FIG. 2a, the transitions of the thermographic recording 12 are fluid, it is expedient to define a temperature threshold value 20 in order to represent a sharp limit for the temperature anomaly 18. FIG. 2c shows that the temperature anomalies 18 sharpened in this way are particularly pronounced around the defined flux wetting surface 6.

Although the thermographic recordings 12 described in FIG. 2 can be used to visually display a sharply defined temperature anomaly 18 by means of the temperature threshold value 20, for the data analysis 48 and the electronic superimposition 40 of the image 8 and the thermographic recording 12 and for the further process control of the flux application 2 or the soldering process, it is expedient to define more detailed criteria for the quality of the flux application 2. There are several expedient and possible procedures for this, an example of a possible procedure for evaluation is described in FIG. 3. Based on point Z, an exemplary flux wetting surface in FIG. 2b, the temperature recorded there is described in FIG. 3 as a function of time.

Figure 3:
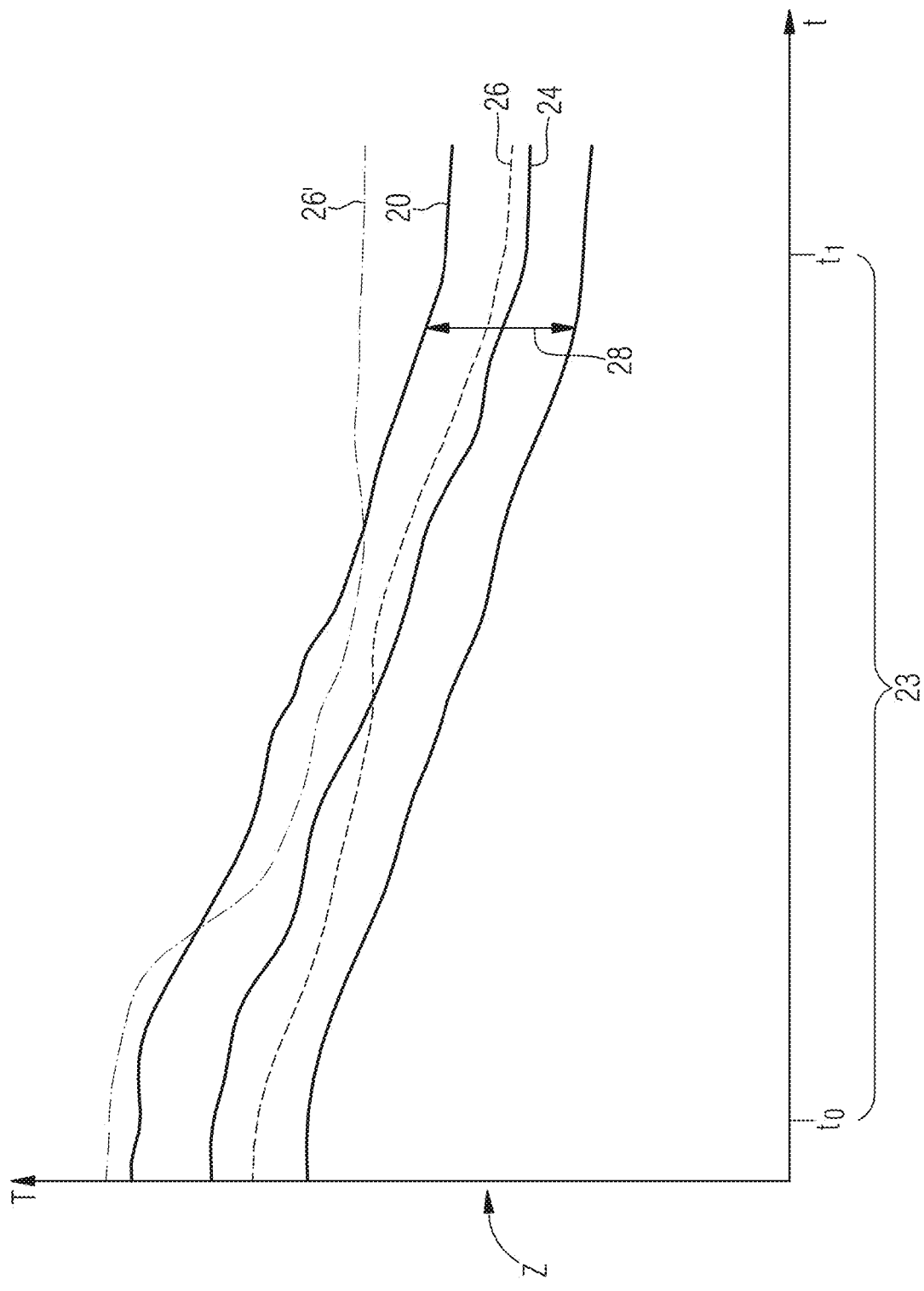
FIG. 3 shows a time-temperature curve of temperature anomalies on the application surface of FIG. 2b.

FIG. 3 shows a time-temperature diagram at point Z in FIG. 2. In this case, the point to and the point $t_1$ are defined on the time axis t. The point to is the point in time at which the flux 14 is sprayed onto the flux wetting surface 6, in other words, onto the point Z here. The time $t_1$ is the time of observation. The period of time between to and $t_1$ is regarded as a time interval 23. It is now possible to consider only a singular point in time at $t_1$ or the temperature profile at the point Z during the temperature interval 23.

If the temperature profile during the time interval 23 is considered, it is expedient to record a reference profile 24 in which high-quality application of flux 14 has taken place by means of process evaluation. It is expedient to define a tolerance range 28 around the reference profile 24, which results in an upper and lower boundary line to the reference profile 24. The observation of only one singular point in time is an upper and lower limit temperature at this point in time. The upper profile of the tolerance range 28 with respect to the temperature axis T preferably represents the temperature threshold value 20 as a function of time t.

If the actual temperature-time profile in the time interval 23 is now considered, this profile 26 should, if possible, lie within the tolerance range 28 around the reference profile 24. In this case, the quality criteria for applying the flux 14 would be fulfilled and the printed circuit board would (if these quality conditions are sufficient for all flux wetting surfaces 6) be supplied to the further soldering process (positive temperature evaluation 54 in FIG. 1). However, if a considered temperature-time profile 26' is outside the tolerance range 28, a measure 22 in the soldering process 24 can be initiated in the flux application 2 as described with regard to FIG. 1 (negative temperature evaluation 46).

When considering the temperature-time profile 26 according to FIG. 3, a time-dependent thermographic recording 12 is created by means of the infrared camera 36. Accordingly, a thermographic video is recorded along the time interval 23. A time-dependent recording has the advantage that a more detailed evaluation of the actual flux application and the evaporation behavior can be made. The decision as to whether sufficient flux 14 has been applied, which takes place by the data analysis 40, can thus be made more reliably as it concerns a longer period of time. In principle, however, a singular point in time, for example, at the point in time $t_1$, can also be recorded and an assessment can be made as to whether the measured temperature value recorded in this way is below the threshold value 20.

The advantage of the described methods may include, therefore, using the knowledge of local temperature anomalies 18 due to the evaporation of flux components to draw conclusions about the amount of flux 14 applied at defined locations, i.e. the flux wetting surfaces 6, and, if necessary, to initiate quality assurance measures 22 for the soldering process 4 or the flux application 2. Based on this knowledge and these measures 22 introduced, the quality of the entire product, i.e. the printed circuit board 34, can be improved and a reject rate can be reduced.

LIST OF REFERENCE CHARACTERS

2 Flux
4 Soldering process
6 Flux utilization area
8 Image
10 Conductor platform surface
12 Thermographic recording
14 Flux
16 Adjustment points
18 Temperature anomalies
20 Temperature threshold
22 Measure
23 Time interval T Temperature
24 Reference profile
26 Considered T-t profile
Z Defined flux calculation area
28 Tolerance range
30 Computer system
32 Conveyor belt
34 Printed circuit board
36 Infrared camera
38 Soldering unit
40 Superimposition of image/recording
42 Evaluation
44 Positive temperature evaluation
46 Negative temperature evaluation
48 Data analysis

The invention claimed is:

1. A method for monitoring a flux application in a soldering process, the method comprising:
　defining respective locations for flux wetting surfaces in relation to an image of an application surface;
　generating a thermographic recording of the application surface selectively provided with liquid flux;
　defining adjustment points on the application surface which can be identified on the image and on the thermographic recording;
　superimposing the image and the thermographic recording on the basis of the adjustment points; and
　comparing temperature anomalies on the application surface identified by the thermographic recording with the respective locations of the flux wetting surfaces on the image.

2. The method as claimed in claim 1, wherein a temperature threshold value is set for the temperature anomalies.

3. The method as claimed in claim 2, further comprising initiating a measure for influencing the soldering process if, within a time interval after application of the flux, a temperature determined by the thermographic recording is on a flux wetting surface beyond the temperature threshold value;
　wherein the measure initiated is selected from the group consisting of: applying additional flux to the flux wetting surface, and cleaning one or more flux application nozzles.

4. The method as claimed in claim 3, further comprising considering the temperature as a function of time.

5. The method as claimed in claim 4, further comprising:
　recording a reference profile of a temperature-time curve a defined flux wetting surface; and
　comparing the reference profile with the temperature-time profile.

6. The method as claimed in claim 5, wherein a tolerance range 28 of the reference profile is defined, and the measure is initiated when the considered temperature-time profile is outside the tolerance range.

7. The method as claimed in claim 3, wherein the measure is taken when the temperature on the flux wetting surfaces exceeds the temperature threshold value.

8. The method as claimed in claim 1, wherein the thermographic recording comprises a plurality of such recordings within a period of time.

9. The method as claimed in claim 1, wherein the image comprises a photographic recording of the application surface to be observed.

* * * * *